Dec. 28, 1965  J. B. WEST  3,225,889
MACHINE FOR PACKAGING FOOD PRODUCTS
Filed July 2, 1963  11 Sheets-Sheet 1

INVENTOR.
JOHN B. WEST
BY
Albert J. Kramer
ATTORNEY

Dec. 28, 1965 J. B. WEST 3,225,889
MACHINE FOR PACKAGING FOOD PRODUCTS
Filed July 2, 1963 11 Sheets-Sheet 2

INVENTOR.
JOHN B. WEST
BY Albert J. Kramer
ATTORNEY

Dec. 28, 1965 J. B. WEST 3,225,889
MACHINE FOR PACKAGING FOOD PRODUCTS
Filed July 2, 1963 11 Sheets-Sheet 4

INVENTOR.
JOHN B. WEST
BY
Albert J. Kramer
ATTORNEY

FIG.12.

Dec. 28, 1965    J. B. WEST    3,225,889
MACHINE FOR PACKAGING FOOD PRODUCTS
Filed July 2, 1963    11 Sheets-Sheet 6

INVENTOR.
JOHN B. WEST
BY *Albert J. Kramer*
ATTORNEY

INVENTOR.
JOHN B. WEST
BY Albert J. Kramer
ATTORNEY

Dec. 28, 1965 J. B. WEST 3,225,889
MACHINE FOR PACKAGING FOOD PRODUCTS
Filed July 2, 1963 11 Sheets-Sheet 8

INVENTOR.
JOHN B. WEST
BY *Albert J. Kramer*
ATTORNEY

Dec. 28, 1965   J. B. WEST   3,225,889
MACHINE FOR PACKAGING FOOD PRODUCTS
Filed July 2, 1963   11 Sheets-Sheet 9

INVENTOR.
JOHN B. WEST

BY *Albert J. Kramer*
ATTORNEY

Dec. 28, 1965　　　　J. B. WEST　　　　3,225,889
MACHINE FOR PACKAGING FOOD PRODUCTS
Filed July 2, 1963　　　　11 Sheets-Sheet 10

INVENTOR.
JOHN B. WEST
BY Albert J. Kramer
ATTORNEY

Dec. 28, 1965   J. B. WEST   3,225,889
MACHINE FOR PACKAGING FOOD PRODUCTS
Filed July 2, 1963   11 Sheets-Sheet 11

INVENTOR.
JOHN B. WEST
BY *Albert J. Kramer*
ATTORNEY

3,225,889
MACHINE FOR PACKAGING FOOD PRODUCTS
John B. West, P.O. Box 362, Grasty Road, Pikesville, Md.
Filed July 2, 1963, Ser. No. 292,359
13 Claims. (Cl. 198—20)

This invention relates to packaging machines and it is more particularly concerned with a machine for packaging various food products.

Developments in the merchandising of food products have, in recent years, been directed more and more to the packaging of prepared foods in special containers for convenient handling, storage and ultimate use. To be practical, however, these packaged products must be mass produced with automatic machinery in order to limit the use of labor to a minimum. Heretofore, it has been difficult and expensive to provide machinery for this purpose in view of the fact that a single manufacturer may produce many different items of packaged products. For example, a dairy, ordinarily, packages many products in so called "tubs," such as cottage cheese, sour cream, etc., using different size containers, notably pints, half-pints, quarts, etc. Machinery ordinarily adapted to handle one size tubs, for instance, is not suited to the handling of tubs of other sizes. This required special machines to be provided, not only for different types of containers, but for different size containers and also for different foods to be placed in the containers.

The difficulties in providing a machine that can be used with different types of containers, different foods and different size containers are quite formidable and well known. Notably among these difficulties is the problem of adjusting the operation of the machine to the different periods of time required to fill containers of different volumes and to synchronize each time requirement with other functions of the machine, including the filling of the containers, the closing of the containers, and the discharge of the final product from the machine. Heretofore, it was necessary to use duplicate machinery for different types and sizes of containers, and also for many different food materials being packaged. This frequently resulted in grossly inefficient use of the machinery, idle periods of machinery during working hours, and the overall problem in a single plant of scheduling production.

A broad object of the present invention is the provision of a food packaging machine having a basic structure which can be readily adapted to operate with different materials and with different containers for packaging the materials.

A specific object of the invention is the provision of a basic machine structure that is adapted to receive and to function with interchangeable units having different operating characteristics for the purpose indicated above.

Another object of the invention is the provision of a basic machine structure of the type mentioned which is capable of being attached to a plurality of filling units for similar operation, such as where a container is to be charged with more than one material e.g., ice cream, chocolate topping, nuts, coconut shreds, etc.

A further object of the invention is the provision of a machine of the type mentioned which is sturdy, capable of being operated by relatively inexperienced personnel in a factor, and which is relatively easy to adapt to different operating requirements and to maintain in operating condition.

These and still further objects, advantages and features of the invention will be apparent from the following description considered together with the accompanying drawing.

Referring to the drawing with more particularity the embodiment of the invention illustrated therein comprises a base enclosure having a bottom panel 41, side panels 42, 43, end panels 44, 45 and a top panel 46, all connected together and mounted on rear wheels 47, 48 and a rear caster 49. The front wheels are provided with braking units 50 and 51 and rear legs 52 to releasably hold the machine in a stationary position.

Mounted on the front end of the base enclosure is the turret unit comprising a lower gear housing 53, an upper gear housing 54, and a horizontal hub 55 of a loading wheel 56 disposed between the housings 53 and 54. A hollow stationary cylindrical column 57 is axially disposed in the housing 53 and it extends upwardly therethrough partway into the housing 54. It is supported at the bottom on an annulus 58 forming part of the frame structure of the machine.

The column 57 is surrounded by a cylindrical sleeve 59, the bottom of which is secured to a spur gear 60.

The sleeve 59 is rotatably supported on the housing 53 by means of a flange 61 at the top forming a downwardly facing shoulder 62 resting on the inner race 63 of a roller bearing 64, the outer race 65 resting on an upwardly facing annular shoulder 66 of the housing 53 formed by an inwardly projecting portion 67.

The hub 55 rests on and it is screwed to the upper end of the sleeve 59 and locked by dowel 68 and supports the column 57 by means of a ball bearing 69. The upper housing 54 has a central portion 70 and it is supported by the column 57 and is clamped against inner race of bearing 69 by locknut 71.

An annular seal plate 73 extends across the space between the hub 55 and the portion 70 and it is held in place at its inner edge 74 by a retaining nut 75. The outer edge 76 is sealed to the hub by means of a sealing ring 77 between it and an annular rib 78 of the hub.

A similar sealing ring 79 is provided between a flange 80 at the bottom of the hub and the upper end of housing 53.

An additional bearing 81 is provided between the sleeve 59 and the housing 53.

Within the column 57 there is disposed a hollow shaft 82. The lower end of the column extends downwardly through a gear casing 83 and is supported in a bearing 84 of a boss 85 of the casing. The hub of a spur gear 86 within the casing is secured to a recessed portion 87 of the shaft 82 by means of a nut 88. The inner race 89 of the ball bearing 84 is inserted between the shoulder 90 of the shaft formed by the recess 87 and the top of the hub of the gear 86, the outer race being secured to a collar 91 of the gear casing between a retaining ring 92 and a flange 93.

Above the spur gear 60 another spur gear 94 is rotatably mounted on the sleeve 59. To the upper end of the shaft 82 within the housing 54 a spur gear 95 is disposed with a bearing 96 and held in place by a nut 97 against a shoulder of the shaft.

The gear 60 is driven by a barrel type indexing cam 98, the groove 99 of which is adapted to engage a series of cam followers 100 secured to the bottom of the gear in spaced circumferential relation.

The cam 98 is secured to a shaft 101 rotatably mounted on roller bearings 102 and 103 in the walls 104 and 105 of the casing 83.

The shaft 101 at one end is secured to a bevel gear 106 for rotation therewith which meshes with another bevel gear 107 at the upper end of a vertical shaft 108 that is rotatably mounted on the casing walls by means of bearings 109 and 110.

Secured to the shaft 108 is a pinion 111 which meshes with the spur gear 86. Also, secured to the shaft for rotation therewith is a worm wheel 112 which is in meshed relation with a worm 113 on the end of a drive shaft 114.

The shaft 108 extends beyond the bottom bearing 110 to the exterior of the housing and is secured to a barrel cam 116 for rotation therewith. The groove 117 of the cam 116 engages a cam follower 118, the function of which will be described hereinafter.

A counter shaft 119 has a pinion 120 at one end meshing with the spur gear 86 and another pinion 121 at the other end meshing with the spur gear 94 whereby these two gears are driven in unison.

The drive shaft 114 is rotatably mounted in bearings 122 and 123 and is powered by an electric motor 124 through a pair of conventional variable pulley units 125 and 126 connected by a V-belt 127. The cheeks 128 and 129 of the pulley unit 126 are adjustable relative to each other by means of an adjusting sprocket 130 that forms part of the conventional unit. This adjusting sprocket is geared by chain 131 to a sprocket 132 on a shaft 133 mounted in the control unit box 134 and it is actuated manually by a crank handle 135.

The cheeks 136 and 137 of the pulley unit 125 are spring loaded to yield under pressure exerted by belt 127.

It will be apparent, therefore, that power is transmitted from the motor 124 to the drive shaft 114 through the variable speed pulley units 125 and 126 and thence through the worm 113 and worm wheel 112 to the shaft 108. Power from the shaft 108 drives gear 86 through the pinion 111 and also the cam 98 through bevel gears 106 and 107. This cam action results in an intermittent rotation of the gear 60 which is directly connected to the sleeve 59 and hence results in the intermittent rotation of the sleeve 59 and of the hub 55 which is attached to it, while the gears 94 and 95 are constrained to rotate in unison through the countershaft 119 and pinions 120 and 121. The spur gear 95 is also constrained to rotate with these two gears because of the common connection of the gears 86 and 95 to the shaft 82.

The gear housing 53 is provided with a number of circumferential access openings 143 (seven shown), each having a cover 144 removably secured to the housing by lug bolts 145. By these means, a unit (not shown) having a driving gear meshable with either the gear 60 or the gear 94 may be mounted on any of these seven faces of the housing and driven in synchronization with either the uniform rotation of shaft 83 or the intermittent rotation of sleeve 59 as may be desired.

Figure 12:
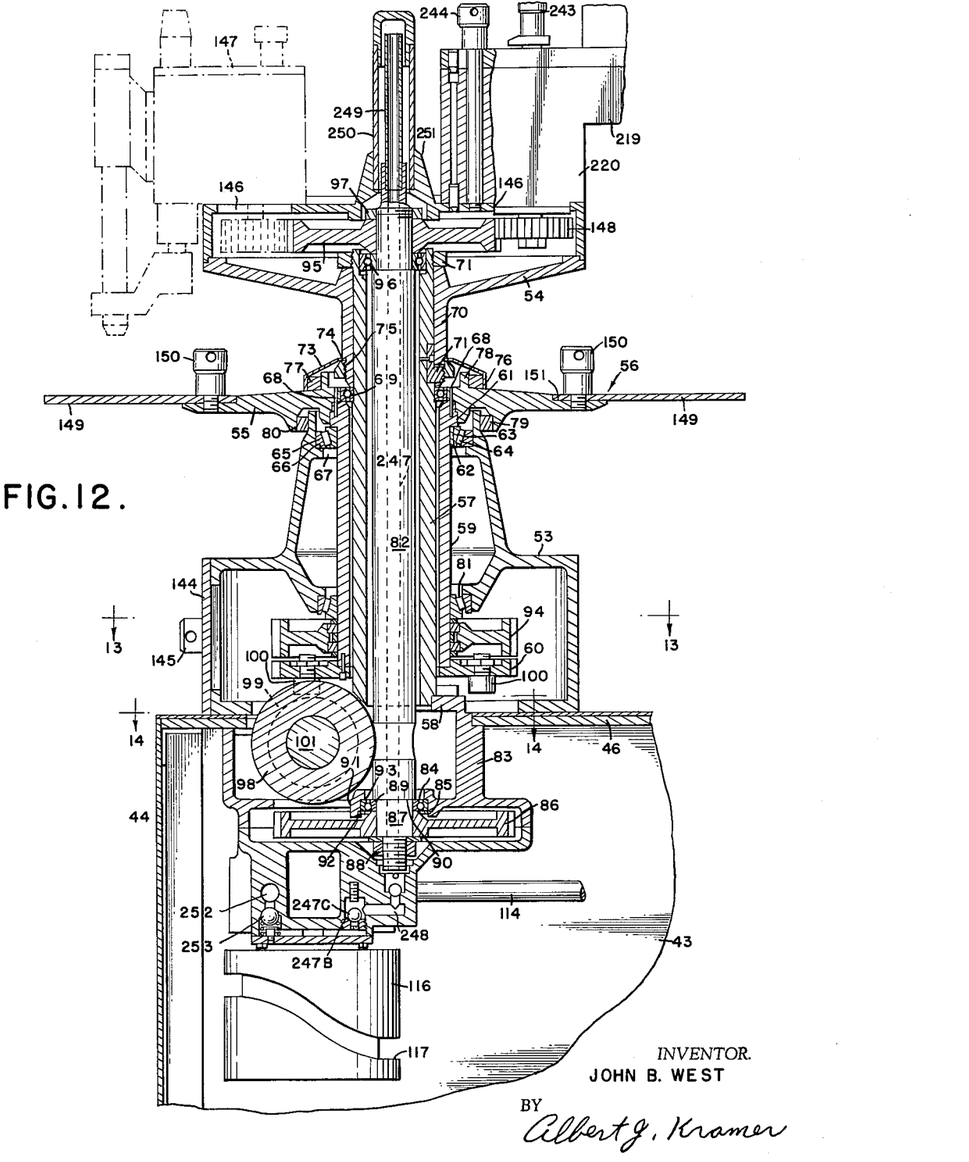
FIG. 12 (sheet 5) is a longitudinal sectional view on a larger scale of the turret assembly and parts appurtenant thereto.
Figure 13:
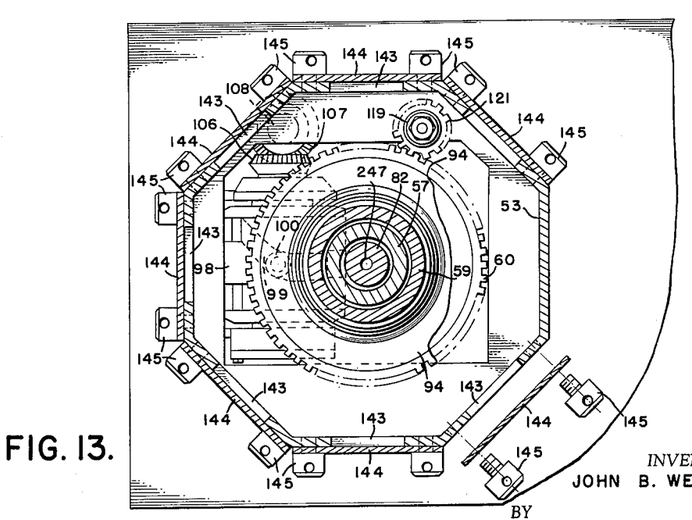
FIG. 13 (sheet 4) is a cross-sectional view along the line 13—13 of FIG. 12.
Figures 14, 15, 15A, 16:
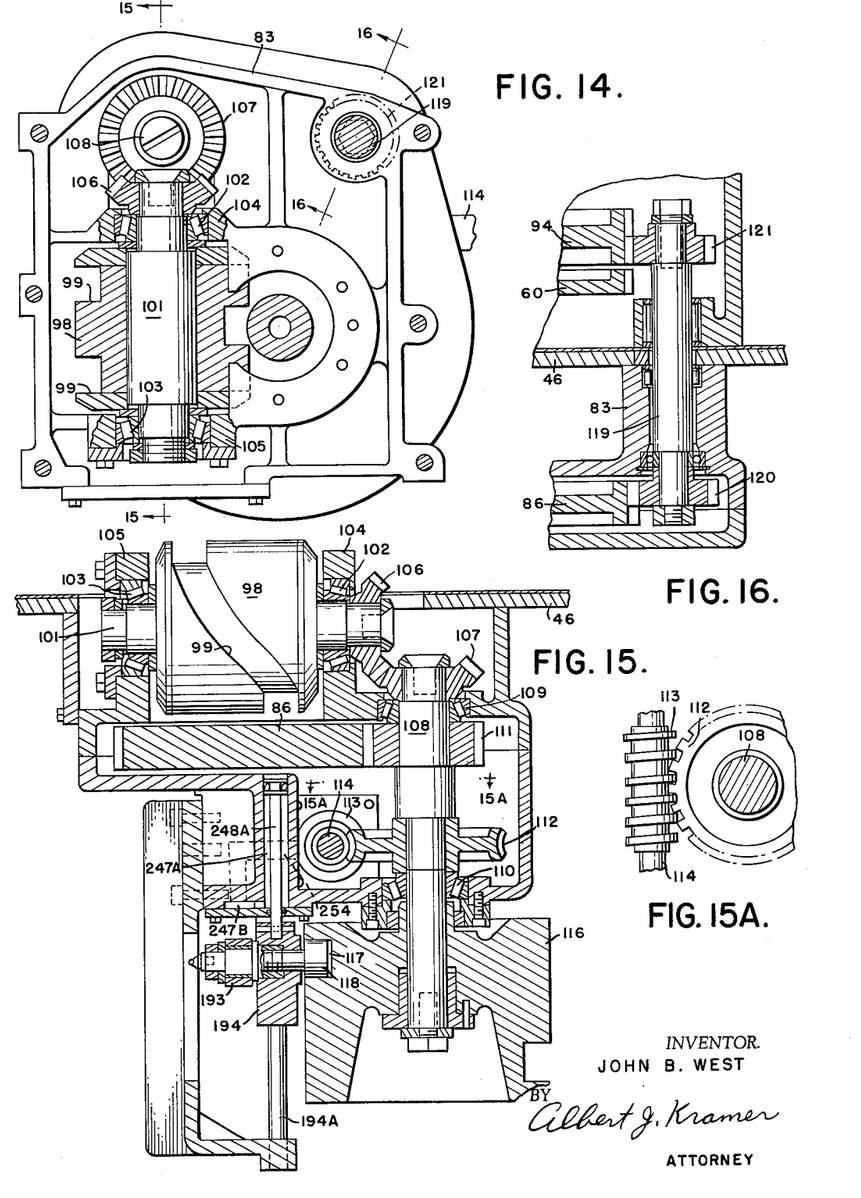
FIG. 14 (sheet 6) is a plan view, generally along the line 14—14 of FIG. 12.
FIG. 15 (sheet 6) is a sectional view along the line 15—15 of FIG. 14.
FIG. 15A (sheet 6) is a sectional view along the line 15A—15A of FIG. 15.
FIG. 16 (sheet 6) is a sectional view along the line 16—16 of FIG. 14.

Similarly, the housing 54 is provided with openings 146 for the reception of units to be driven by the gear 95, such as a liquid filling unit 147 shown in outline by the broken lines in FIG. 12. The gear 95 is also used to drive the transfer unit hereinafter more fully described and having its driving gear 148 disposed through one of the openings 146 and in meshed relation with the gear 95.

Figure 8:
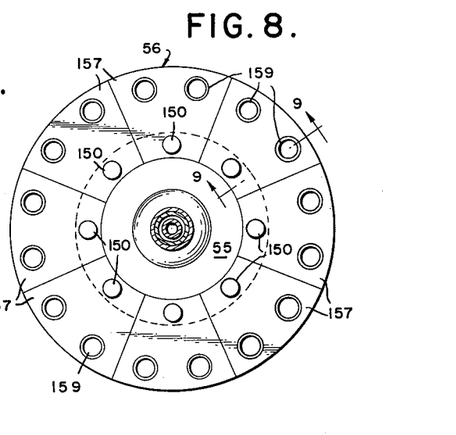
FIG. 8 (sheet 2) is a view similar to FIG. 5 showing a different group of wheel sectors for use with a different type container.
Figure 9:
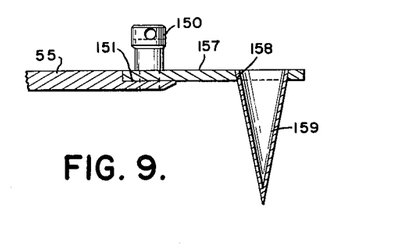
FIG. 9 (sheet 2) is a sectional view along the line 9—9 of FIG. 8.
Figure 24:
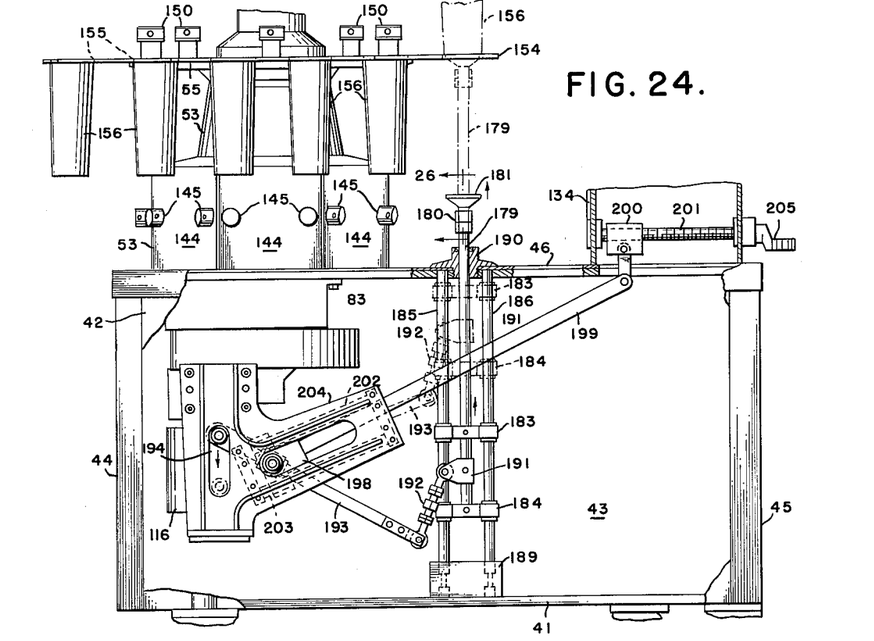
FIG. 24 (sheet 9) is a view similar to FIG. 20 with the elevator linkage adjusted to operate on different size containers.
Figures 25, 26:
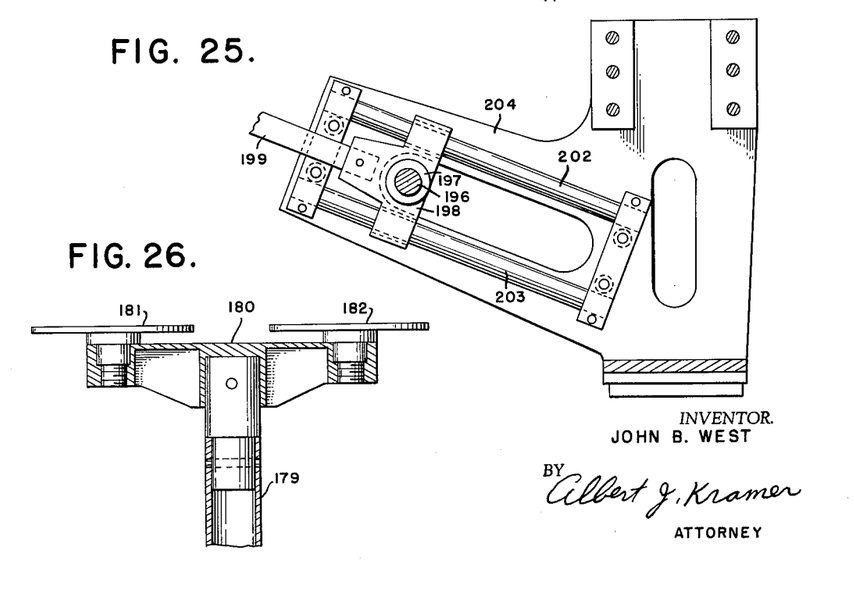
FIG. 25 (sheet 9) is a fragmentary view of the cross head constituting a portion of the elevator linkage.
FIG. 26 (sheet 9) is a sectional view of a fragmentary portion of FIG. 24 along the line 26—26.

The hub 55 is adapted to support a set of wedge sections 149 which together form a circular plate to complete the loading wheel 56. These sections 149 are removably secured to the hub 55 by means of lug bolts 150 and their inner edges are seated flush with the hub in an annular recess 151 on the periphery of the hub. The hub is adapted to receive different sets of such wedge sections to operate with different types of containers. For example, the set of sections 149 have apertures 152 at their periphery for supporting relatively short frusto-conical containers 153. Another set 154 (see FIG. 24) contains apertures 155 for supporting relatively large containers 156, and still another set 157 (see FIGS. 8 and 9) contains apertures 158 adapted to support conical ice cream cone jackets 159. These wedge sections are readily removed from the hub 55 and replaced with substitute sections by means of the lug bolts 150.

The conveyor unit

Figure 1:
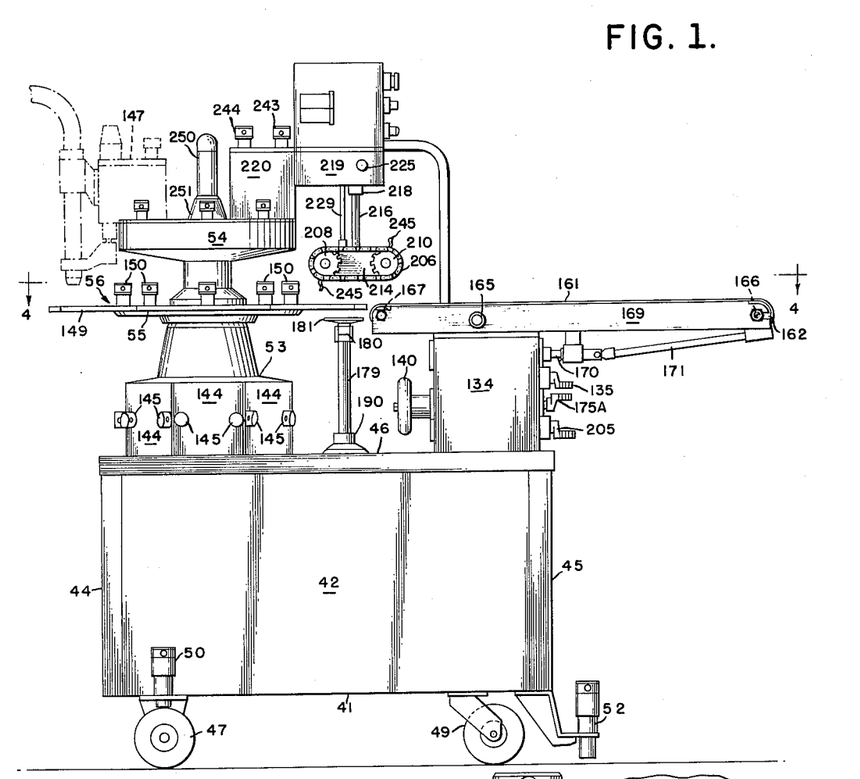
FIG. 1 (sheet 1) is a side elevational view of an embodiment of the invention with the position of a filling unit shown attached thereto in broken lines.
Figures 2, 3:
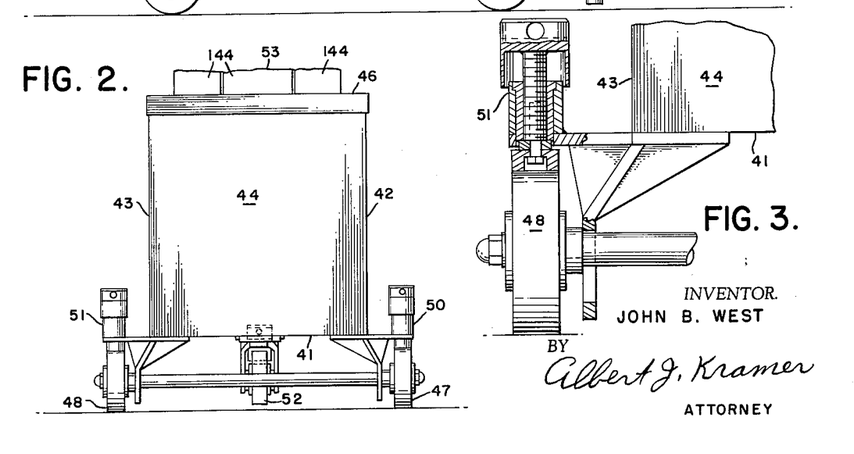
FIG. 2 (sheet 1) is an elevational view of the embodiment, partly broken away, as seen from the left side of FIG. 1.
FIG. 3 (sheet 1) is a fragmentary view, partly in section, of one of the front wheel mountings and brake.
Figure 4:
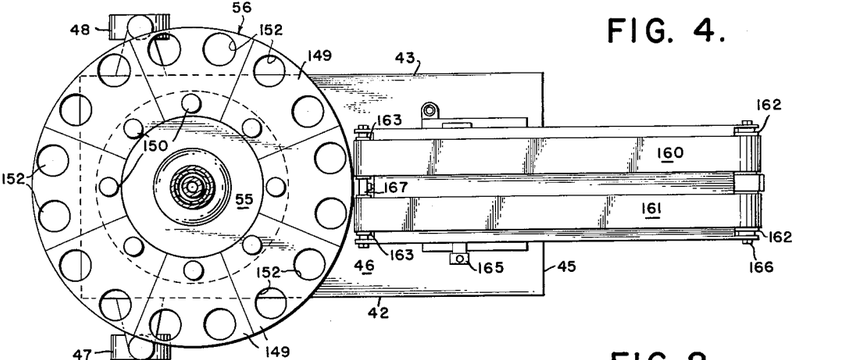
FIG. 4 (sheet 2) is a plan sectional view along the line 4—4 of FIG. 1.
Figure 5:
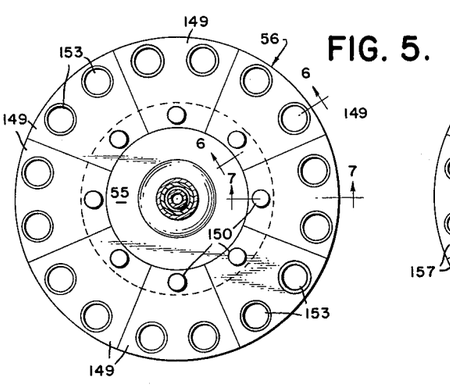
FIG. 5 (sheet 2) is a plan view of a portion of FIG. 4 showing the loading wheel or turntable with containers supported therein.
Figure 6:
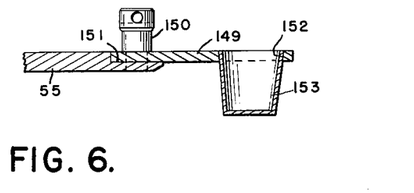
FIG. 6 (sheet 2) is a sectional view along the line 6—6 of FIG. 5.
Figure 7:
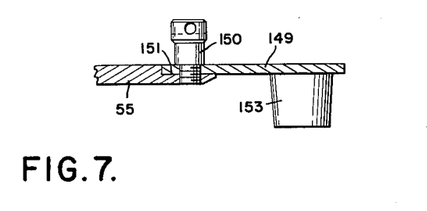
FIG. 7 (sheet 2) is a sectional view along the line 7—7 of FIG. 5.
Figure 17:
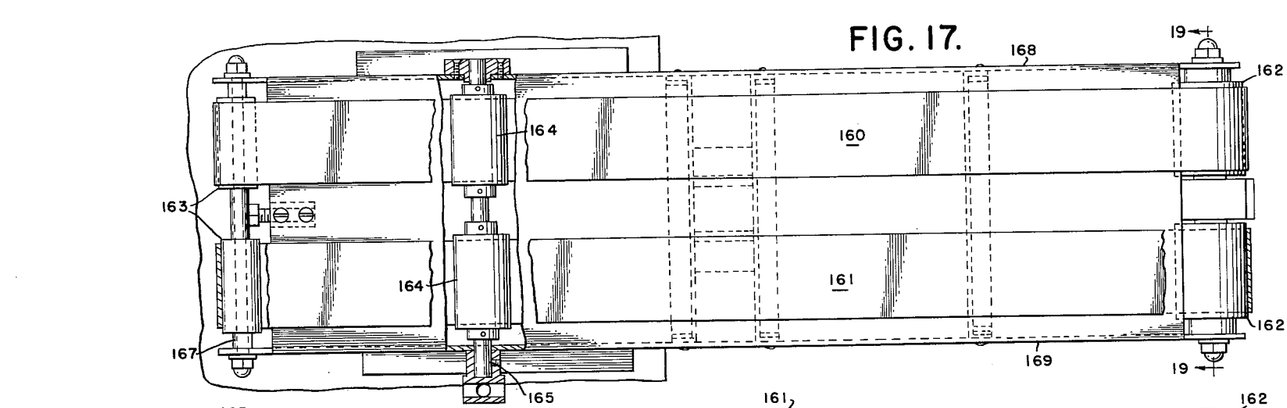
FIG. 17 (sheet 7) is a plan view of the conveyor unit, apart from the machine as a whole, on a larger scale, with parts broken away.
Figures 18, 19:
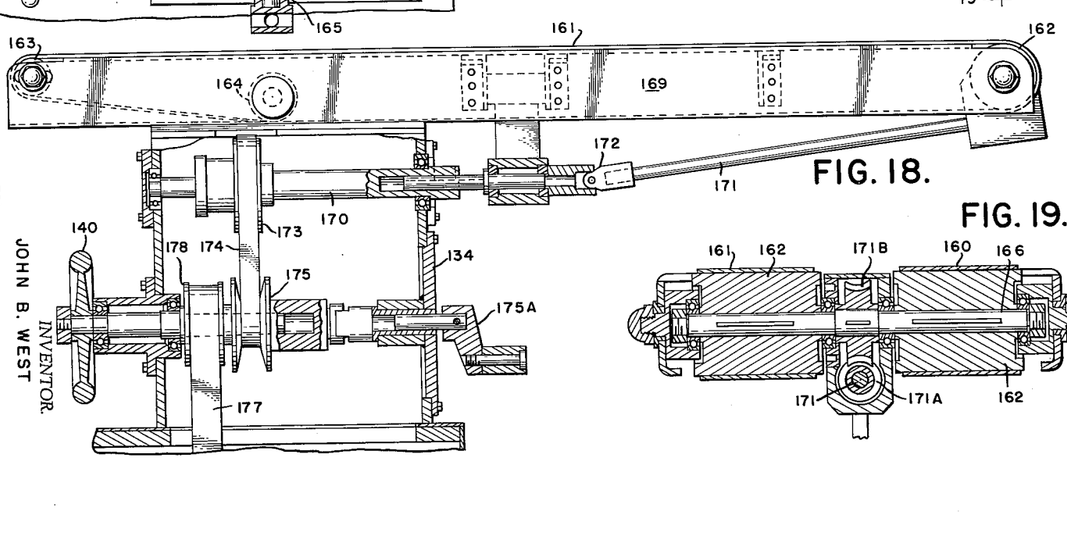
FIG. 18 (sheet 7) is a side elevational view of the conveyor unit shown in FIG. 17 with parts broken away.
FIG. 19 (sheet 7) is a cross-sectional view along the line 19—19 of FIG. 17.
Figure 20:
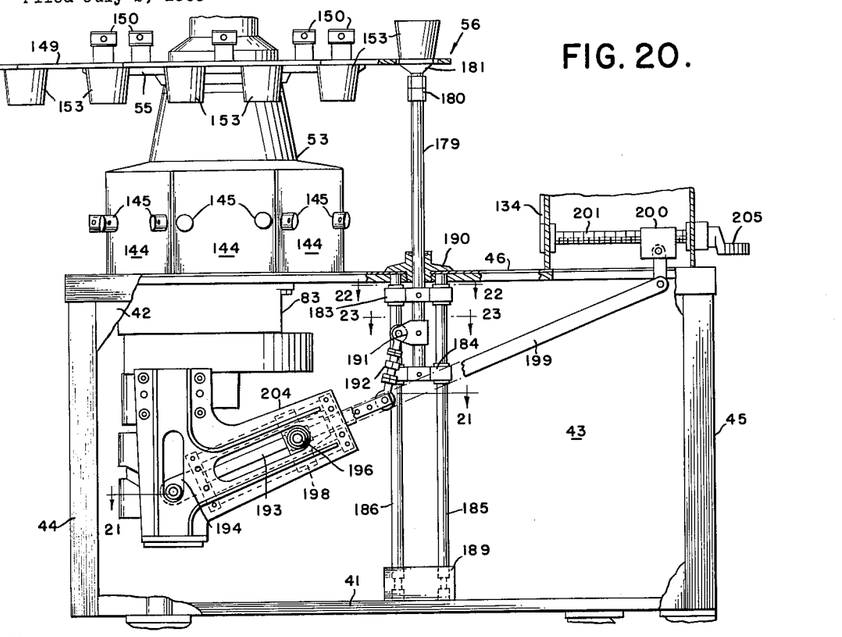
FIG. 20 (sheet 8) is a view similar to FIG. 10 with parts removed, showing the elevator linkage in a different position.
Figure 21:
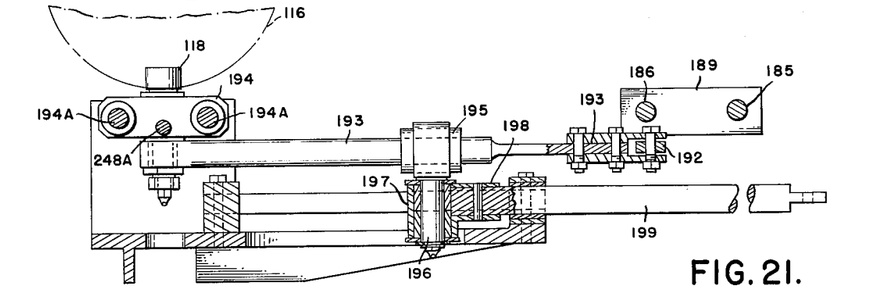
FIG. 21 (sheet 8) is a sectional view of a fragmentary portion of FIG. 20 along the line 21—21.
Figure 22:
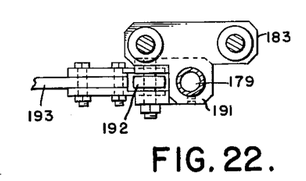
FIG. 22 (sheet 8) is a sectional view along the line 22—22 of FIG. 20.
Figure 23:
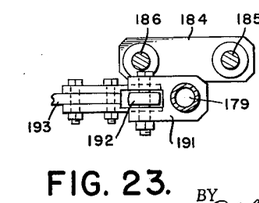
FIG. 23 (sheet 8) is a sectional view along the line 23—23 of FIG. 20.

The conveyor unit comprises a pair of endless belts 160 and 161 spaced apart in side by side relation on front and rear rollers 162, 162, and 163, 163, respectively. The rollers are mounted on and keyed to axles 166 and 167 on longitudinal frame members 168 and 169. Additional intermediate rollers 164 and axle 165 may be provided as needed (See FIG. 17). The belts are spaced apart in an amount corresponding to the circumferential spacing of adjacent receptacle apertures of the loading wheel 56 (see FIG. 4), so as to be in alignment to receive packaged articles as they are removed from the wheel by the transfer unit.

The conveyor unit is mounted on the control box 134 and it is powered through a counter shaft 170 in the control box connected to a drive shaft 171 of the conveyor through a universal joint 172. The counter shaft 170 receives its power through a conventional spring-loaded variable pulley 173 and through V-belt 174 meshing with a conventional variable pulley unit 175 in the control box unit, the latter being driven by a take-off driving pulley 176 of the shaft 114 through a belt 177 and driven by pulley 178 attached to same shaft as is unit 175, thereby synchronizing the conveyor belts with the parts powered by the shaft 114, but at the same time providing speed control through the variable pulley drives. The drive shaft 171 is connected to a worm 171A that meshes with a worm wheel 171B keyed to the axle 166. The pulley unit 175 has a conventional crank handle 175A for adjusting the conical cheeks and thereby varying the speed. A hand wheel 140 permits manual operation for testing and setting up purposes.

*The elevator unit*

At the periphery of the loading wheel 56, adjacent the conveyor unit, the elevator unit is disposed, the purpose of which is to raise the filled containers from the apertures of the loading wheel to place them in a position to be transferred to the conveyor unit by the transfer unit.

The elevator unit comprises a vertical reciprocating shaft 179 at the upper end of which is mounted a cross beam 180 having a pair of pads 181 and 182 so spaced and positioned as to contact an adjacent pair of filled containers on the loading wheel and elevate them to a position above the wheel when the shaft is moved upwardly. The shaft 179 is secured to a pair of vertically spaced cross heads 183, 184 that are slidably mounted on stationary guide rods 185 and 186 between apertures 187, 188 in the top panel 46 of the base enclosure and apertures in a block member 189 secured to the bottom panel 41.

A collar 190 is disposed in the top panel 46 to receive and seal the shaft as it reciprocates.

The shaft 179 is reciprocated by power transmitted to an arm 191 connected to one end of an adjustable link 192, the other end of the link being connected to a lever 193 extending from a reciprocating crosshead 194 attached to the cam follower 118. The crosshead 194 is reciprocated on a pair of parallel upright stationary guide rods 194A.

The lever 193 is provided with an adjustable fulcrum by means of a sleeve 195 slidably mounted on the lever, and having a stub shaft 196 integral therewith extending to a bearing 197 in a crosshead 198 at the lower end of a diagonal arm 199 attached to the carriage 200 of a lead screw 201 in the control box unit.

The crosshead 198 is slidably mounted on a pair of parallel slide rods 202 and 203 of a stationary frame member 204.

By these means, the lower limit of travel of the shaft 179 is made adjustable while the upper limit of its travel remains constant, thereby permitting the use of this elevator mechanism with containers of different vertical dimensions simply by turning the lead screw 201 with its crank handle 205.

*The transfer unit*

Figure 10:
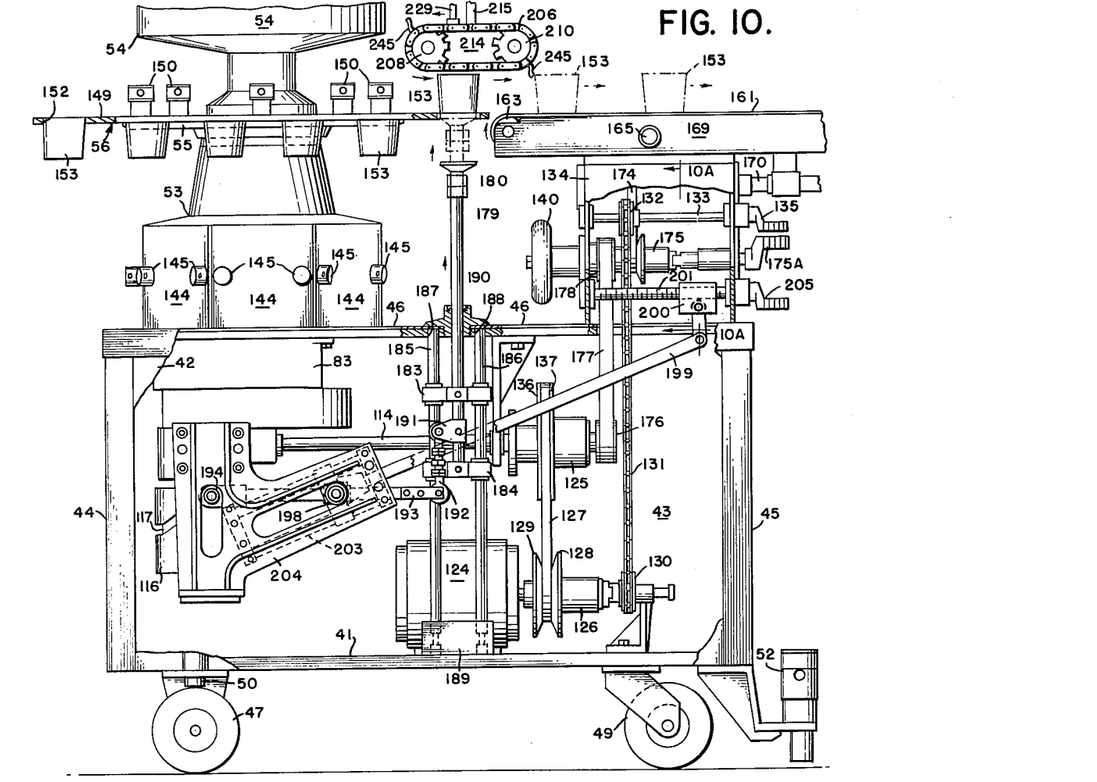
FIG. 10 (sheet 3) is a view similar to FIG. 1 with parts broken away.
Figure 10A:
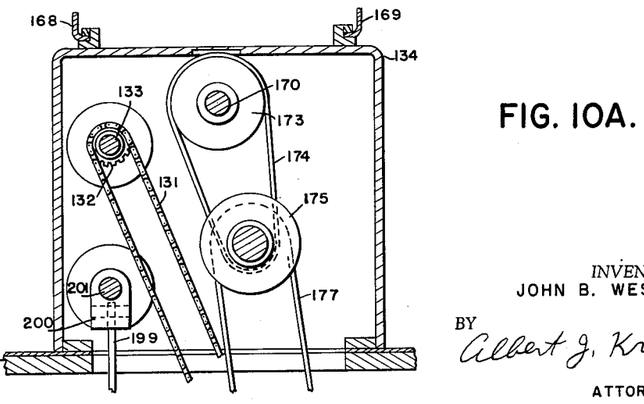
FIG. 10A (sheet 3) is a sectional view along the line 10A—10A of FIG. 10.
Figure 11:
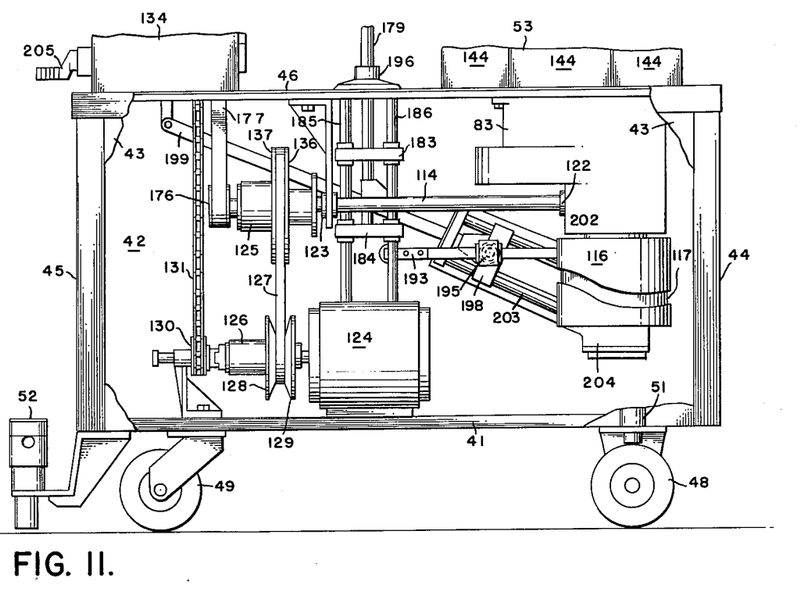
FIG. 11 (sheet 4) is an elevational view of the lower portion of FIG. 1, shown from the opposite side on a larger scale, with parts broken away.

From the uppermost position of the containers on the pads 181 and 182, the transfer unit moves them to the conveyor unit (see FIG. 10). This transfer unit comprises a pair of endless chains 206, 207 mounted on sprockets 208, 209 and 210, 211 that are secured to front and rear axles 212 and 213 on a frame 214. The frame 214 is adjustably supported over the pads 181 and 182 by means of a pair of mounting bars 215 and 216, the ends of which are welded or otherwise secured to the frame 214 and the upper parts slidably disposed in sockets 217 and 218 of a horizontal section 219 integral with and extending cantileverwise from a vertical section 220. These sections together form an inverted L-shaped housing 221 of the transfer unit.

The frame 214 is held in adjusted positions by means of clamps 222, 223, respectively, carried on a clamping screw 224 fitted with a hand knob 225.

Figure 27:
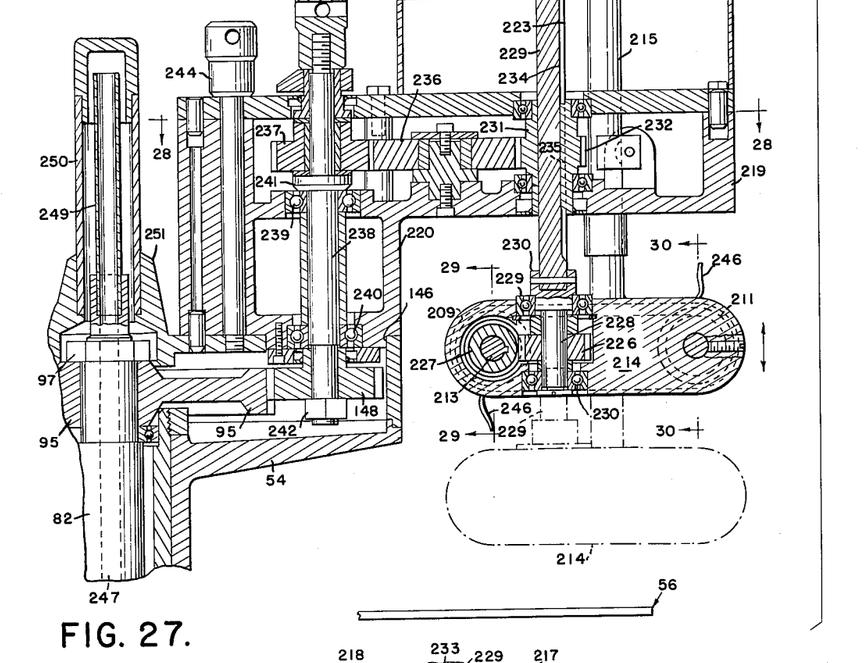
FIG. 27 (sheet 10) is a vertical sectional view through the transfer unit and parts of the main machine to which it is attached.
Figure 28:
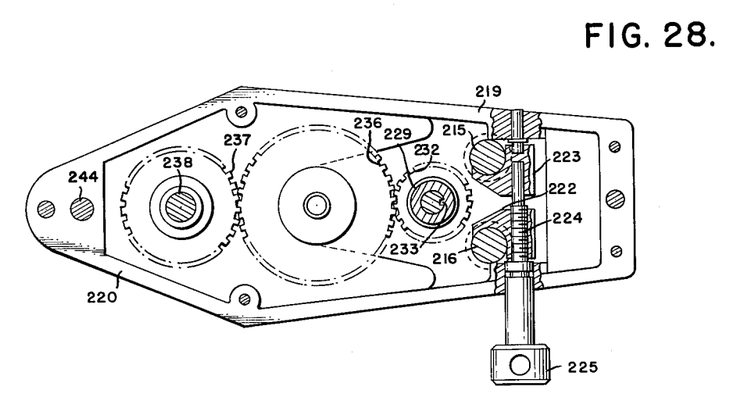
FIG. 28 (sheet 11) is a plan sectional view along the line 28–28 of FIG. 27.
Figure 29:
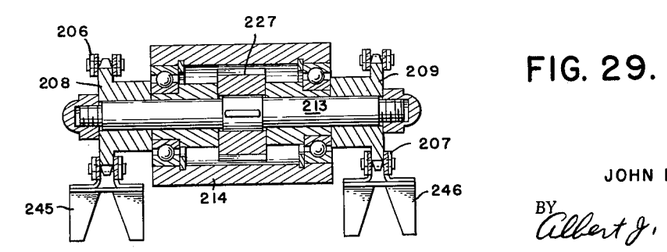
FIG. 29 (sheet 11) is a sectional view along the line 29—29 of FIG. 27.
Figure 30:
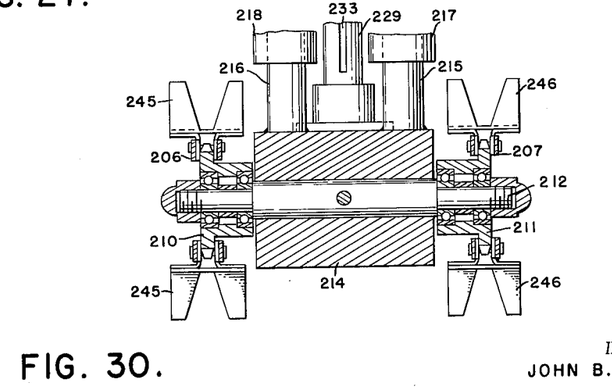
FIG. 30 (sheet 10) is a sectional view along the line 30—30 of FIG. 27.
Figure 31:
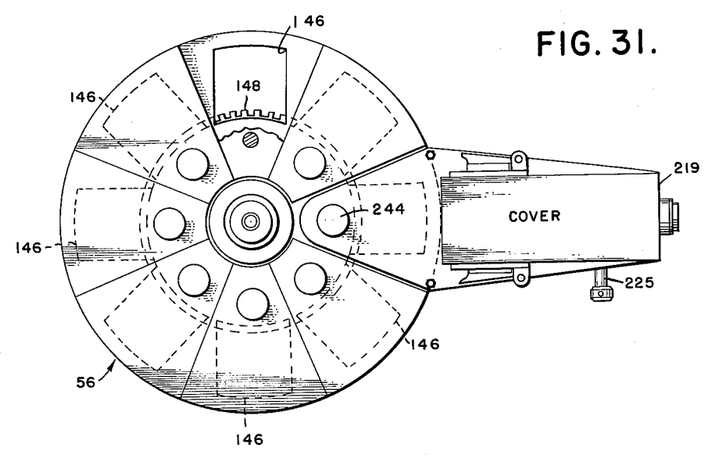
FIG. 31 (sheet 11) is a plan view of the unit of FIG. 27 and of the part to which it is attached.

The chains 206 and 207 are driven by power delivered to the axle 213 through a pair of helical gears 226 and 227, the gear 227 being secured to the axle 213 and the meshing gear 226 being secured to a stub shaft 228 mounted in bearings 229 and 230 and is slidably disposed through the hub 231 of a pinion 232 in the horizontal housing section 219. The hub 231 is rotatably mounted in bearings on the opposite upper and lower walls of the housing section 219 (see FIG. 27) and the shaft 229 is slidably keyed to it by means of an axial key 233 seated in a groove 234 of the shaft and engaged in groove 235 in the hub, thereby maintaining a locked rotational relation in different vertical positions of the shaft relative to the housing section 219. The pinion 232 meshes with an idler spur gear 236 in the housing section 219 which, in turn, meshes with a pinion 237 secured to a vertical shaft 238 in the vertical section 220 of the housing, and to which shaft the driving gear 148 is secured for engagement with the spur gear 95.

The shaft 238 is mounted by means of conventional machine elements, including bearings 239, 240, a thrust collar 241 and clamp knob 243, which clamps gear 237 with a friction washer for timing purposes. The unit as a whole is held in position on the housing 54 by means of a clamping bolt 244.

Fingers 245 and 246 are secured to the chains 206 and 207 and project outwardly therefrom to contact the containers as the chains are driven and thereby move the containers onto the conveyor unit.

*The oil system*

The shaft 82 is hollow to provide a passageway for lubricating oil that is forced upwardly by a pump 247A having its plunger 248A connected to reciprocating crosshead 194. The oil from the pump passes through a T-shaped passageway 247B, gravity biased check valve 247C, and passageway 248 which connects with the bottom of the passageway 47. The upper end of the shaft 82 is adapted to receive and support a vertical pipe 249 which is surrounded by a casing 250 closed at the top with a transparent plastic cap. The casing 250 is open at the bottom in communication with the interior of the housing 54 and it is supported on the housing by means of an annular bracket 251. By these means, as oil is pumped upwardly through the passageway 247, it overflows the upper end of the pipe 249 and flows downwardly by gravity between the pipe 249 and casing 250. It enters the gear housing 54 around the upper end of the shaft 82 and forms a pool in the bottom of the housing which overflows into the space between the shaft 82 and the column 57. It continues to flow downwardly into the casing below the column and finally through cross duct 254 into intake passageway 252, through check valve 253, where it enters the pump 247A for recirculation. The check valve 253 is loaded with a spring 255 for bias in a direction opposite to the gravity bias of the check valve 247C, whereby on reciprocation of the pump 248A oil is pulled in through the check valve 253 and delivered through the check valve 247C.

Having thus described my invention, I claim:

1. A machine of the character described comprising a horizontal loading wheel having a series of circumferential apertures adapted to support open containers to be filled, a vertical cylindrical sleeve concentrically secured to the wheel, means for rotatably supporting the sleeve, a shaft rotatably mounted in the sleeve, coaxially, means for rotatably supporting the shaft, a driving gear adapted to drive auxiliary units of the machine, said gear being connected to the shaft for rotation therewith, a source of power, means actuated by the source of power for intermittently rotating the sleeve and means actuated by the same source of power for rotating the shaft independently of the sleeve, a housing for the driving gear, and an auxiliary unit removably attached to and supported by the housing in juxtaposition to the driving gear, said unit having a power input gear in meshed relation with said driving gear.

2. A machine of the character described comprising a horizontal loading wheel having a series of circumferential apertures adapted to support open containers to be filled, a vertical cylindrical sleeve secured to the wheel concentrically, means for rotatably supporting the sleeve, a shaft rotatably mounted in the sleeve coaxially, means for rotatably supporting the shaft, a driving gear adapted to drive auxiliary units of the machine, said gear being connected to the sleeve for rotation therewith, a source of power, means actuated by the source of power for intermittently rotating the sleeve and means actuated by the same source of power for rotating the shaft independently of the sleeve, a housing for the driving gear and auxiliary units removably attached to and supported by the housing in juxtaposition to the driving gear, said auxiliary units having each a power input gear in meshed relation with said driving gear.

3. A machine as defined by claim 2 in which the housing has a plurality of openings therein for exposing the gear wheel to the auxiliary units to be driven thereby at selected circumferential positions.

4. A machine as defined by claim 3, a cover plate for each of said openings and means for removably securing the cover plates to the housings.

5. A machine of the type described comprising a horizontal loading wheel having a series of circumferential apertures adapted to support open containers to be filled, a vertical cylindrical sleeve secured to the wheel concentrically, means for rotatably supporting the sleeve, a shaft rotatably mounted in the sleeve, concentrically, means for rotatably supporting the shaft, said shaft extending above the wheel, a first driving gear adapted to drive auxiliary units of the machine, said gear being connected to the shaft above the wheel for rotation therewith, a source of power, means actuated by the source of power for intermittently rotating the sleeve, means actuated by the same source of power for rotating the shaft independently of the sleeve, a second driving gear for driving auxiliary units of the machine connected to the sleeve below the wheel for rotation therewith, a housing for each of said driving gears and auxiliary units removably attached to and supported by said housings in juxtaposition to the said driving gears, respectively, said units having each a power input gear in meshed relation with its respective driving gear.

6. A machine of the character described comprising a horizontal loading wheel having a series of circumferential apertures adapted to support open containers to be filled, a vertical cylindrical sleeve concentrically secured to the wheel, means for rotatably supporting the sleeve, a shaft rotatably mounted in the sleeve coaxially, means for rotatably supporting the shaft, a driving gear adapted to drive auxiliary units of the machine, said gear being connected to the shaft for rotation therewith, a source of power, means actuated by the source of power for intermittently rotating the sleeve, means actuated by the same source of power for rotating the shaft independently of the sleeve in which the driving gear is disposed above the loading wheel, a housing surrounding the driving wheel, an opening in the housing for exposing the driving gear, a conveyor unit on one side of the loading wheel, a reciprocating elevator unit below the loading wheel on the side thereof adjacent the conveyor unit for contacting containers supported in apertures of the wheel and lifting them above the wheel for discharge therefrom to the conveyor unit, a unit mounted on the housing of the driving gear for transferring containers lifted by the elevator to the conveyor unit, said last mentioned unit having an actuating mechanism, including a pinion gear in meshed relation with the driving gear in said housing.

7. A machine of the character described comprising a horizontal loading wheel having a series of circumferential apertures adapted to support open containers to be filled, a vertical cylindrical sleeve concentrically secured to the wheel, means for rotatably supporting the sleeve, a shaft rotatably mounted in the sleeve coaxially, means for rotatably supporting the shaft, a driving gear adapted to drive auxiliary units of the machine, said gear being connected to the shaft for rotation therewith, a source of power, means actuated by the source of power for intermittently rotating the sleeve, means actuated by the same source of power for rotating the shaft independently of the sleeve and a conveyor unit on one side of the loading wheel, a reciprocating elevator unit below the loading wheel on the side thereof adjacent the conveyor unit, for contacting containers supported in apertures of the wheel and lifting them above the wheel for discharge therefrom to the conveyor unit, and means above the wheel and elevator unit for transferring containers lifted by the elevator to the conveyor unit.

8. A machine as defined by claim 7 and a variable speed transmission between the source of power and the conveyor.

9. A machine as defined by claim 7 in which the elevator unit comprises a vertical reciprocable shaft, a linkage between the shaft and the power source, said linkage including a lever having one end connected to the shaft and the other end connected to the power source, a shiftable fulcrum between the ends of the lever, and means for shifting the position of the fulcrum between said ends.

10. A machine as defined by claim 9 in which the means for reciprocating the shaft comprises a barrel cam having a groove thereon, a cam follower in the groove, a lever having one end connected to the cam follower, the other end being connected to the shaft, a sleeve on the lever, a cross-head pivotally supporting the sleeve and means for rigidly supporting the cross-head in different positions between the ends of the lever.

11. A machine as defined by claim 7 in which the elevator unit comprises a vertical reciprocable shaft, a linkage between the shaft and the power source, said linkage including a lever having one end connected to the shaft and the other end to a source of reciprocating motion, a sleeve slidably mounted on the rod, a cross-head pivoted to the sleeve and means for rigidly supporting the cross-head in different positions to vary the position of the sleeve along the lever and thereby varying the mechanical advantage between the power source and the shaft.

12. A machine as defined by claim 7 in which the transfer unit comprises a movable finger and means for moving the finger to contact the containers and transfer them from the elevator to the conveyor.

13. A machine of the character described comprising a horizontal loading wheel having a series of circumferential apertures adapted to support open containers to be filled, a vertical cylindrical sleeve concentrically secured to the wheel, means for rotatably supporting the sleeve, a shaft rotatably mounted in the sleeve coaxially, means for rotatably supporting the shaft, a driving gear adapted to drive auxiliary units of the machine, said gear being connected to the shaft for rotation therewith, a source of power, means actuated by the source of power for intermittently rotating the sleeve and means actuated by the same source of power for rotating the shaft independently of the sleeve, a housing for the driving gear, means for removably supporting an auxiliary unit on the housing in juxtaposition to the driving gear, said means for rotatably supporting the sleeve comprising a hollow cylindrical column between the sleeve and the shaft, said shaft having a longitudinal passageway for the flow of lubricating oil therethrough, means communicating said passageway with the interior of the housing for the flow of the oil from the passageway to the housing, and means communicating the interior of the housing with the space between the column and the sleeve for the flow of oil from the housing to the space, and means communicating said space with said passageway for the flow of oil from the space to the passageway.

References Cited by the Examiner
UNITED STATES PATENTS

| | | | |
|---|---|---|---|
| 2,427,712 | 9/1947 | Casler | 198—209 X |
| 2,778,478 | 1/1957 | Brook | 198—107 |
| 2,834,383 | 5/1958 | Williams | 141—176 X |
| 2,907,858 | 10/1959 | Distler | 198—209 X |
| 2,936,798 | 5/1960 | Cummings | 222—288 X |

SAMUEL F. COLEMAN, *Primary Examiner.*

EDWARD A. SROKA, *Examiner.*